(12) United States Patent
Yu (10) Patent No.: US 9,201,829 B2
(45) Date of Patent: Dec. 1, 2015

(54) LOW POWER, AREA-EFFICIENT TRACKING BUFFER

(75) Inventor: Shu-Yi Yu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 13/605,496

(22) Filed: Sep. 6, 2012

(65) Prior Publication Data

US 2014/0068204 A1 Mar. 6, 2014

(51) Int. Cl.
*G06F 12/06* (2006.01)
*G06F 13/40* (2006.01)

(52) U.S. Cl.
CPC ......... *G06F 13/4027* (2013.01); *Y02B 60/1228* (2013.01); *Y02B 60/1235* (2013.01)

(58) Field of Classification Search
CPC . G06F 12/06; G06F 13/4037; G06F 12/0802; G06F 12/0866; G06F 12/0875; G06F 2212/27; G06F 2212/45; G06F 2003/0691; G06F 3/0656
USPC ................. 711/141, 146, 147, 154, 158, 203, 711/E12.031, E12.065, E12.06, 15; 714/39; 235/377
See application file for complete search history.

(56) References Cited

U.S. PATENT DOCUMENTS

| | | | |
|---|---|---|---|
| 6,047,339 A * | 4/2000 | Su et al. | 710/56 |
| 6,173,378 B1 * | 1/2001 | Rozario et al. | 711/163 |
| 6,282,367 B1 | 8/2001 | Cho et al. | |
| 6,304,936 B1 | 10/2001 | Sherlock | |
| 6,804,769 B1 | 10/2004 | Carlson | |
| 7,409,534 B1 | 8/2008 | Uht | |
| 7,424,557 B2 * | 9/2008 | Houg | 710/52 |
| 2009/0193164 A1 * | 7/2009 | Ajanovic et al. | 710/107 |
| 2012/0290752 A1 * | 11/2012 | Lim | G06F 13/4022 710/110 |
| 2013/0117476 A1 * | 5/2013 | Miller et al. | 710/52 |

FOREIGN PATENT DOCUMENTS

| | | |
|---|---|---|
| EP | 1191452 | 9/2001 |
| EP | 2388707 | 5/2011 |
| WO | 9922302 | 5/1999 |

OTHER PUBLICATIONS

International Search Report and Written Opinion from PCT/US2013/058082, mailed Feb. 5, 2014, Apple Inc., pp. 1-9.
International Preliminary Report in application No. PCT/US2013/058082, mailed Mar. 19, 2015, Apple Inc., pp. 1-9.

* cited by examiner

*Primary Examiner* — Matthew Bradley
*Assistant Examiner* — Kamal Dewan
(74) *Attorney, Agent, or Firm* — Meyertons, Hood, Kivlin, Kowert & Goetzel, P.C.; Erik A. Heter (57) ABSTRACT

A tracking buffer apparatus is disclosed. A tracking buffer apparatus includes lookup logic configured to locate entries having a transaction identifier corresponding to a received request. The lookup logic is configured to determine which of the entries having the same transaction identifier has a highest priority and thus cause a corresponding entry from a data buffer to be provided. When information is written into the tracking buffer, write logic writes a corresponding transaction identifier to the first free entry. The write logic also writes priority information in the entry based on other entries having the same transaction identifier. The entry currently being written may be assigned a lower priority than all other entries having the same transaction identifier. The priority information for entries having a common transaction identifier with one currently being read are updated responsive to the read operation.

25 Claims, 6 Drawing Sheets

| Entry | V | ID | Order |
|---|---|---|---|
| 0 | 0 | -- | -- |
| 1 | 1 | 0 | 0 |
| 2 | 1 | 0 | 1 |
| 3 | 0 | -- | -- |
| 4 | 1 | 1 | 1 |
| 5 | 1 | 1 | 0 |
| 6 | 1 | 0 | 2 |
| 7 | 0 | -- | -- |

- Entries 0, 3, and 7 Free
- Entries 1, 2, 4, 5, and 6 contain Valid Data (B)

| Entry | V | ID | Order |
|---|---|---|---|
| 0 | 1 | 1 | 2 |
| 1 | 1 | 0 | 0 |
| 2 | 1 | 0 | 1 |
| 3 | 0 | -- | -- |
| 4 | 1 | 1 | 1 |
| 5 | 1 | 1 | 0 |
| 6 | 1 | 0 | 2 |
| 7 | 0 | -- | -- |

- New Tracking data for Transaction ID 1 Written into Entry 0

(C)

| Entry | V | ID | Order | Notes |
|---|---|---|---|---|
| 0 | 1 | 1 | 1 | Order Decremented |
| 1 | 1 | 0 | 0 | |
| 2 | 1 | 0 | 1 | |
| 3 | 0 | -- | -- | |
| 4 | 1 | 1 | 0 | Order Decremented |
| 5 | 0 | -- | -- | Entry retrieved for response process |
| 6 | 1 | 0 | 2 | |
| 7 | 0 | -- | -- | |

- Transaction Data for Transaction ID 1 Read from Entry 5, Priority for Other Instances of Transaction ID 1 Decremented

LOW POWER, AREA-EFFICIENT TRACKING BUFFER

BACKGROUND

1. Technical Field

This disclosure is directed to integrated circuits, and more particularly, to tracking buffers used in various types of integrated circuits.

2. Description of the Related Art

Tracking buffers are used in many applications. For example, tracking buffers can be used to track pending requests by agents of a digital system wherein the requests are awaiting arbitration. Another use of tracking buffers is to track pending responses to requests where the responses are in-flight. Information corresponding to a request may be stored in the tracking buffer when the request arrives, and may be retrieved from the tracking buffer when the request has been arbitrated or is otherwise ready to be sent and/or processed.

Simple tracking buffer designs may append to a given request all the information associated with that request and forward it to its destination. One common approach is to use a first-in, first-out buffer (FIFO) to implement a tracking buffer. A FIFO may be used in applications where strict ordering among requests is desirable.

Another approach is to assign a tracking identifier to either replace an original request identifier or to as additional information appended to the transaction. When a response returns, the tracking identifier may be used to locate the desired information. This approach may be used in applications where out-of-order responses are desirable.

Other approaches may incorporate a mixture of a FIFO and a random-access buffer structure. For example, multiple FIFOs or linked lists may be used to track different threads of transactions where the threads can be accessed in varying order. In general, a wide variety of approaches are available for tracking buffer design.

SUMMARY

A tracking buffer and method of operating therefor is disclosed. In one embodiment, a tracking buffer includes N entries each storing a transaction identifier. Each of the N entries of the tracking buffer also includes an order identifier to indicate the priority of the entry relative to other entries in the tracking buffer having the same transaction identifier. Additionally, each of the N entries of the tracking buffer includes a valid bit that, when set, indicates that the entry is storing valid data. A data buffer also includes N entries, each of which corresponds to a unique one of the N entries of the tracking buffer. Responsive to receiving a request, lookup logic is configured to locate a valid entry in the tracking buffer having a transaction identifier corresponding to the request and a highest priority of all valid entries in the buffer having the same transaction identifier. Responsive to locating the entry, the lookup logic may cause data from a corresponding one of the N entries of the data buffer to be provided.

In one embodiment, a write operation to a tracking buffer may include receiving a transaction identifier. Write logic associated with the tracking buffer may find the first available location to record an entry into the tracking buffer. In one embodiment, the first available location may be that location having a valid bit in a reset state. The write logic may then write the transaction identifier into that location, and may set the valid bit. In addition, the write logic may also record an order identifier in the entry. The order identifier may be generated by determining which other entries of the tracking buffer, if any, also include the same transaction identifier. The write logic may assign the lowest priority to the entry being written among all entries having the same transaction identifier. If no other entries have the same transaction identifier, then the entry being written may be assigned the highest priority, with any future entry having the same transaction identifier being assigned a lower priority.

In various embodiments, the order in which entries are read from the data buffer may depend on transaction and priority information stored in the tracking buffer. Entries corresponding to a common transaction may be read from the data buffer in the same order in which they were written to the data buffer. On the other hand, entries corresponding to different transactions may be read in any order, and more particularly, in the order in which requests for reading data associated with the different transactions are received by the lookup logic.

Requests received by the lookup logic may include information identifying the transaction, and may in some cases be the same as the transaction identifier. In one embodiment, the transaction identifier comprising the request may exclude information appended thereto. Thus, the amount of information transmitted during operation of the transaction buffer is reduced relative to tracking buffer implementation in which extra information is appended to the transaction identifier.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component.

DETAILED DESCRIPTION OF EMBODIMENTS

Figure 1:
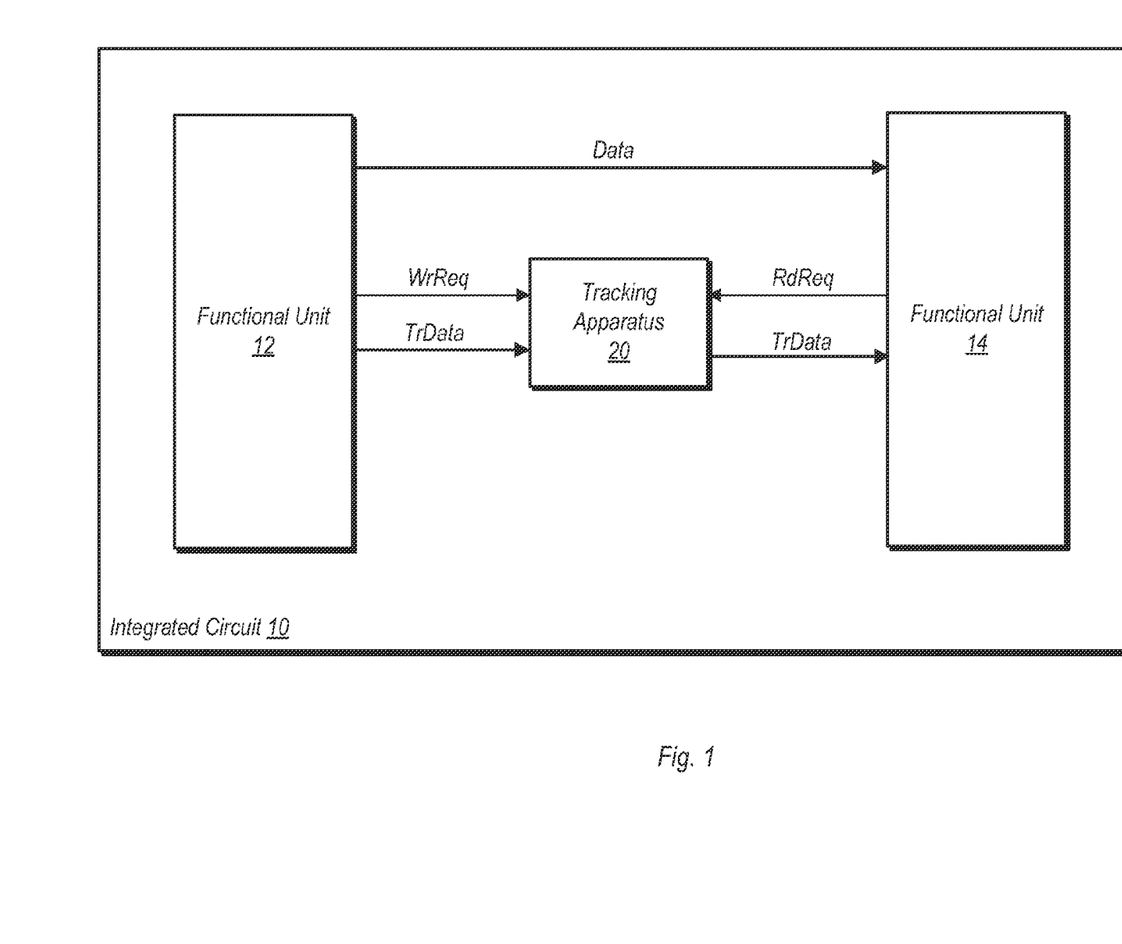
FIG. 1 is a block diagram of one embodiment of an integrated circuit (IC).

FIG. 1 is a block diagram of one embodiment of an integrated circuit (IC). In the embodiment shown, IC 10 includes a first functional unit 12 coupled to communicate with a second functional unit 14. A data path ('data') is coupled between the functional units. IC 10 also includes a tracking apparatus 20, which is coupled between functional unit 12 and functional unit 14. Tracking apparatus 20 may be used to track certain transactions sent from functional 12 to functional unit 14. For example, functional unit 12 may send encrypted data over the data path to functional unit 14, while encryption keys may be sent via tracking apparatus 20. Numerous other applications are possible and contemplated as well.

Tracking apparatus 20 is coupled to receive a write request ('WrReq') and tracked data (TrData) from functional unit 12. Responsive to receiving a write request, tracking apparatus 20 may determine a location in a data buffer therein that tracked data may be written to. Additionally, tracking information may also be written into a tracking buffer within tracking apparatus 20. Information written into the tracking buffer may include a transaction identifier (ID) and an ordering ID (i.e. priority). It is noted that in the embodiment shown, multiple entries may be present for a given transaction (and thus, for a given transaction ID). The ordering information may indicate the ordering for transactions sharing the same transaction ID.

Responsive to receiving a read request ('RdReq), tracking apparatus 20 may locate corresponding data in its tracking buffer and provide this tracked data to functional unit 14. When locating corresponding data in the tracking buffer, tracking apparatus 20 may locate a transaction ID corresponding to the request which has the highest priority for the corresponding transaction. Responsive to finding such an entry in the tracking buffer, logic within tracking apparatus 20 may read tracked data from a corresponding location in the tacking buffer and provide it to functional unit 14.

Tracking apparatus 20 is used for intra-IC communication in the embodiment illustrated in FIG. 1. However, it is also noted that various embodiments of tracking apparatus 20 may be implemented for inter-IC communication as well.

Figure 2:
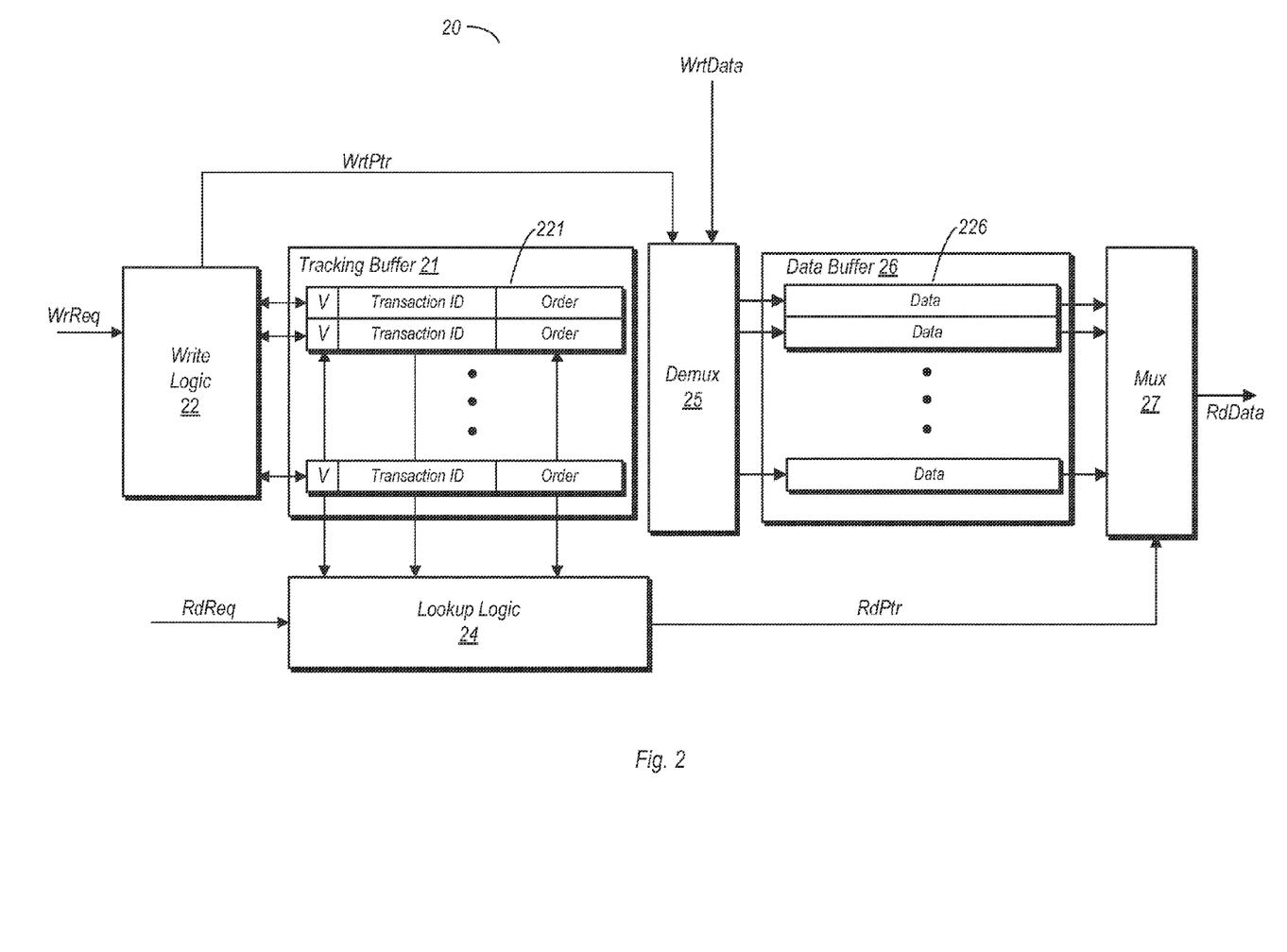
FIG. 2 is a block diagram of one embodiment of a tracking buffer apparatus.

FIG. 2 is a block diagram illustrating one embodiment of a tracking apparatus 20. In the embodiment shown, tracking apparatus 20 includes tracking buffer 21, write logic 22, lookup logic 24, a demultiplexer 25, a data buffer 26, and a multiplexer 27. Tracking buffer 21 in the embodiment shown includes N entries 221. Data buffer 26 in the embodiment shown includes N entries 226, each of which corresponds to a unique on of the N entries 221 in tracking buffer 21. Thus there is a one to one correspondence between tracking buffer entries 221 and data buffer entries 226 in this particular embodiment.

In the embodiment shown, tracking buffer 21 is a content addressable memory (CAM) that may be implemented as a single entity. For a given write operation, information may be written into any available entry 221 of tracking buffer 21. Similarly, entries 221 may be read from tracking buffer in varying order, and thus need not be read in the same order in which they were written, as is the case with a FIFO. This may result in increased flexibility of tracking apparatus 20 relative to embodiments in which one or more FIFO's are used to implement a tracking buffer. Additionally, such an implementation may consume less area and/or power than embodiments that are implemented with FIFO's.

Data buffer 26 in the embodiment shown may also be implemented as a single entity. Data may be read from data buffer 26 in the same order as which tracking data is accessed from tracking buffer 21. Accordingly, data need not be accessed from data buffer 26 in the same order in which it was written, and thus may be implemented using a non-FIFO memory.

Each entry 221 in tracking buffer 21 may store information for tracking the data stored in data buffer 226. In the embodiment shown, each entry 221 includes a valid bit ('V'), a transaction ID ('transaction ID', and an order ID ('order'). The valid bit, when set (e.g., a logic 1), may indicate that the entry is storing valid data. When the valid bit is in a reset state (e.g., a logic 0), the entry is considered to be free and any data stored therein may be overwritten. The transaction ID may indicate a transaction number or other information associated with a given transaction. It is noted that multiple entries 221 may include the same transaction ID.

The order ID may indicate a priority of a particular entry for all entries that share the same transaction ID. For example, if three different valid entries have the same transaction ID, one of the entries will at a given time have the highest priority for that transaction, another entry will have a lowest priority for that transaction, and a third entry will have a priority that is between the highest and lowest. Entries having the same transaction ID may be read in order according to their priority. On the other hand, two or more entries having different and unique transaction ID's with respect to each other may be read in any order.

Entries in tracking buffer 21 may initially be written by write logic 22. Write logic 22 is coupled to receive a write request ('WrReq') comprising one or more signals from another functional unit of the system in which it is implemented. In one embodiment, the write request may exclude any additional information that is appended to the request, and more particularly, may indicate only the transaction ID. When no write request is pending, the write request signal path may be tri-stated in some embodiments, or may be set to a specific state that indicates that no request is currently pending. By limiting the write request to only the transaction ID, chip area and power savings may be realized relative to embodiments in which additional information is appended to the transaction ID.

Responsive to receiving a write request, write logic 22 may search for a free entry in the tracking buffer. In one embodiment, write logic 22 may begin searching at the lowest entry address and search sequentially until a first free entry is found. When a free entry is found, write logic 22 may write the transaction ID into that entry. Furthermore, write logic 22 may also determine which of the other valid entries, if any, include the same transaction ID. If no other valid entries include the same transaction ID, then write logic 22 may write order information into the entry currently being written indicating that entry has the highest priority for that particular transaction. If one or more additional valid entries include the same transaction ID, write logic 22 may assign a lowest priority for entries of that particular transaction to the entry currently being written.

When writing information to an entry in tracking buffer 21, write logic 22 may also set its corresponding valid bit. Furthermore, upon locating a free entry to write the tracking information, write logic 22 may also generate a write pointer ('WrtPtr'), which may be provided as a selection input to demultiplexer 25. The write pointer may be comprised of one or more signals. The write pointer value generated during the write operation corresponds to the entry in tracking buffer 21 in which the tracking information is to be written. Demultiplexer 25 may receive as an input ('WrtData') the data being tracked that is to be written into data buffer 26. Based on the value of the write pointer received at its select input, the incoming data may be routed to a data entry 226 that corresponds to the entry 221 in tracking buffer 21 to which tracking information was written.

Read operations for tracking apparatus 20 may be conducted under the control of lookup logic 24, which may serve as an access control circuit. In the embodiment shown, lookup logic 24 is configured to receive a read request ('RdReq') comprising one or more signals from a requesting functional unit. The read request may, in some embodiment, include no information other than the transaction ID of the request. By limiting the read request to just the transaction ID, power and chip area savings may be realized over embodiments in which additional information is appended to the request. When no read request is asserted, the signal(s) of the read request path may be tri-stated or otherwise place in a state indicating that no read request is pending.

Responsive to receiving a read request, lookup logic 24 may search tracking buffer for a valid entry including the transaction ID having the highest priority for the corresponding transaction. Since the requested entry is a valid entry having a highest priority for the requested transaction ID, lookup logic 24 may skip over any entry that is marked as invalid (i.e. valid bit is reset) and any entry that is not marked as having the highest priority for its respective transaction. Once invalid and lower priority entries are eliminated from consideration, lookup logic 24 may then search for an entry having the requested transaction ID, since such an entry will correspond to the valid entry having the highest priority for that transaction. Responsive to locating the requested entry, lookup logic 24 may generate the read pointer ('RdPtr'), which is provided to multiplexer 27 as a select input comprising one or more signals. Responsive to receiving the read pointer, multiplexer 27 may select the corresponding entry 226 from data buffer 26, and thus data may be provided therefrom by the output ('RdData') of tracking apparatus 20.

In addition to reading the entry from tracking buffer 21 and selecting the corresponding data from data buffer 26, lookup logic 24 may also update information stored in the tracking buffer. Responsive to a read of tracking information from tracking buffer 21, lookup logic 24 may reset the valid bit in the entry from which the information was read. Furthermore, lookup logic 24 may also update the priority information for any other entry having the same transaction ID as the entry that was most recently read.

Figure 3:
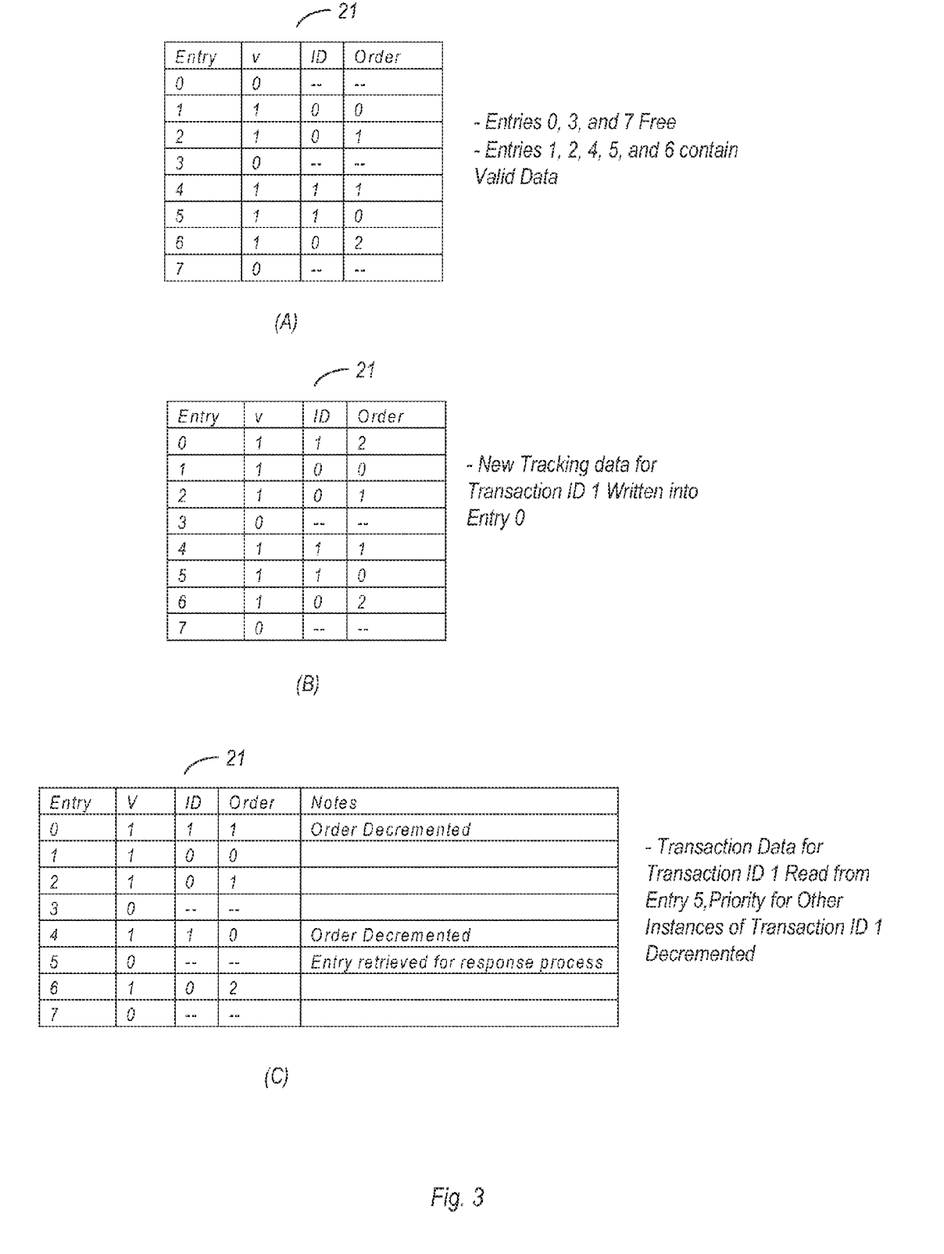
FIG. 3 is a diagram illustrating the operation of one embodiment of a tracking buffer.

FIG. 3 further illustrates the operation of one embodiment of a tracking apparatus. More particularly, FIG. 3, in (A), (B), and (C), illustrates a tracking buffer, a write operation into the tracking buffer, and a read operation from the tracking buffer, respectively. The exemplary tracking buffer 21 shown in (A), (B), and (C) of FIG. 3 include a valid bit field 'V', a transaction ID field 'ID', and a priority field, 'Order'. The 'Notes' field in (C) is not part of tracking buffer 21, but is instead shown for illustrative purposes here.

In (A), an exemplary tracking buffer having eight entries, listed here as entries 0-7. In this example, the valid bit in entries 0, 3, and 7 are in a reset state, and thus these entries are considered to be free (i.e. available) entries, irrespective of any values that may be present in the ID and order field.

Entries 1, 2, 4, 5, and 6 each contains valid data, as indicated by their respective valid bits being set. Entries 1, 2, and 6 contain valid data for transaction ID 0, with priorities of 0, 1, and 2, respectively. Entries 4 and 5 contain valid data for transaction ID 1, with priorities of 1 and 0, respectively. It is noted that in this example, a lower value number in the priority field indicates a higher priority. Thus, entry 1 in the example is the highest priority entry for transaction ID 0, while entry 6 is the lowest priority entry for transaction ID 0.

In (B), new tracking information has been written into entry 0. The information for entry 0 pertains to transaction ID 1. Since two other valid entries are also present for transaction ID 1, the newest entry is assigned a priority of 2, indicating that it has a lower priority than either of the other two entries sharing the same transaction ID. Moreover, as the new tracking information is written into entry 0, its valid bit is set to indicate that it is storing valid information.

In (C), entry 5 is retrieved and read for a response process. As noted in the previous two examples, entry 5 stored valid data for transaction ID 1 having a priority level 0, indicating a highest priority for that corresponding transaction. Upon completion of reading information from entry 5, its valid bit is reset to 0, indicating that the entry is now free. Furthermore, order information stored in entries 0 and 4 is updated responsive to the read. The order information in entry 4 is decremented from a value of 1 to a value of 0, indicating that it is now the highest priority entry for transaction ID 1. Order information in entry 0 is decremented from a value of 2 to a value of 1, indicating that it is next in priority for transaction ID 1 after entry 4.

While entries for a common transaction ID are read in a predetermined order, and more particularly in the same order in which they are written into tracking buffer 21, it is noted that entries for different transactions may be read in any order. For example, after reading the entry for transaction ID 1 in (C), a next request could cause entry 1 corresponding to transaction 0 to be read, irrespective of the order in which it was written relative to any of the other entries corresponding to transaction ID 1.

In the example shown, entries having a common transaction ID may be read in the same order in which they were written, relative to one another. Thus, in the example shown in (B), for transaction ID 1, entry 5 will the first entry to be read for transaction ID 1, with entry 4 being read subsequently thereto, and then entry 0 being the last of the shown entries to be read for that transaction. However, these entries need not be read consecutively. For example, entry 1, which corresponds to transaction ID 0, could be read between the reading of entry 5 and the reading of entry 4 if that is the order in which requests were received. In another example, for five consecutive readings of buffer 21 as shown in (B), entry 5 (transaction ID 1) is read prior to reading entry 4 (transaction ID 1), entry 4 is read prior to reading entry 0 (transaction ID 1), and entry 1 (transaction ID 0) is read before entry 2 (transaction ID 0). However, entry 1 (transaction 0) may be read before or after any of entries 5, 4, or 0 (all transaction ID 1), depending only on the order in which corresponding requests are received. Similarly, entry 2 (transaction 0) may be read in any order relative to entries 5, 4, or 0 if entry 1 (also transaction 0, with higher priority) has also been read.

In general, for a given transaction ID, entries may be read in which they were received, relative to one another, while entries corresponding to a given transaction may be read out of order relative to entries corresponding to different transactions.

Figure 4:
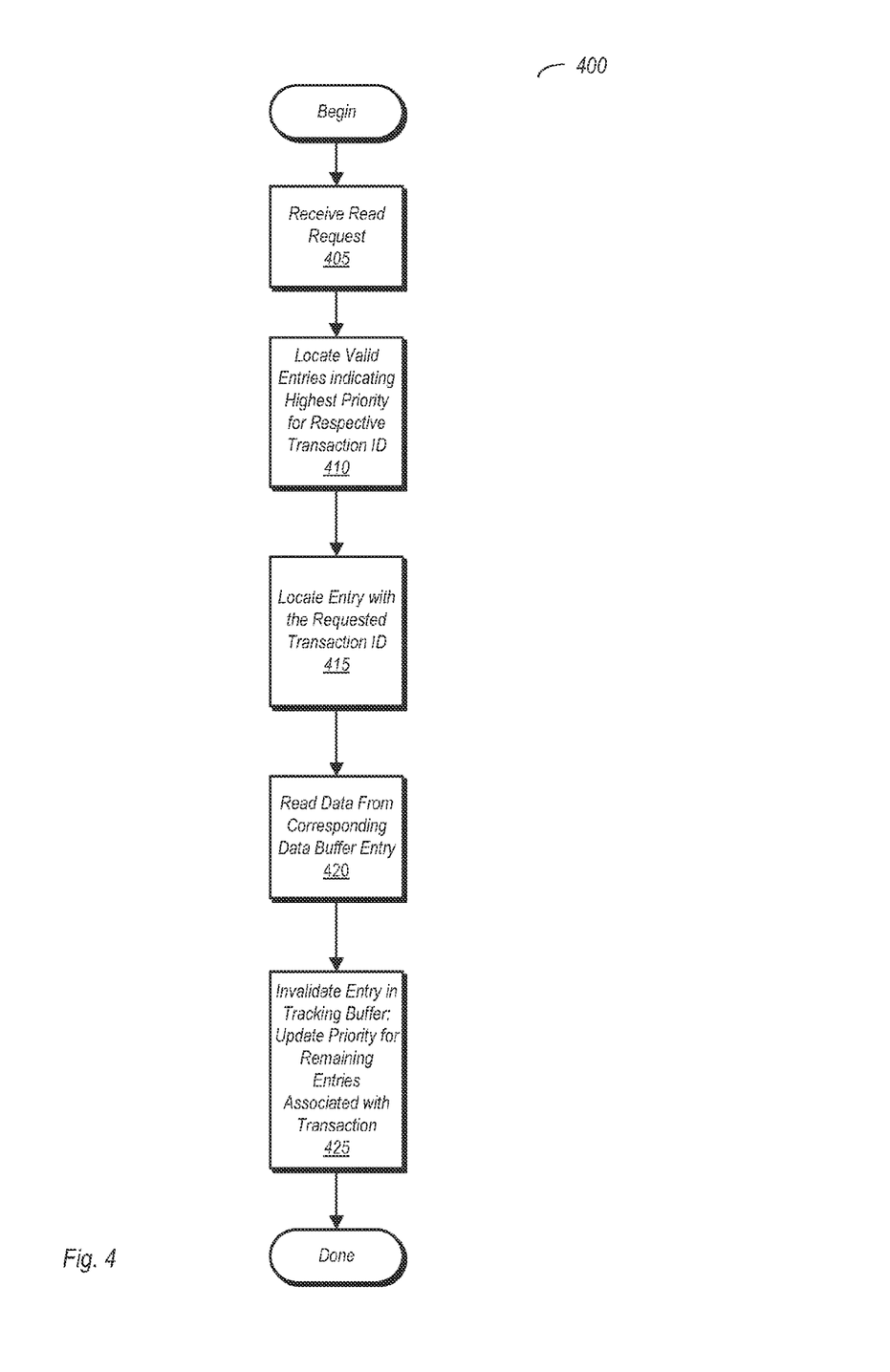
FIG. 4 is a flow diagram illustrating a read operation for one embodiment of a tracking buffer apparatus.

Turning now to FIG. 4, a flow diagram illustrating one embodiment of a method for reading a tracking buffer is shown. Method 400 in the embodiment shown may be applied to the various apparatus embodiments discussed above, and may also be applied to some apparatus embodiments not explicitly discussed herein.

Method 400 begins with the receipt of a read request (block 405). The read request may include a transaction ID indicating the transaction for which information is desired. In some embodiments, no additional information is appended to the transaction ID. Responsive to receiving the transaction ID, lookup or access logic may search the tracking buffer to locate all entries marked as valid and having the highest priority for their respective transactions (block 410). Upon determining which entries are valid and have a highest priority for their respective transactions, the lookup logic may locate an entry with a transaction ID that matches that of the request (block 415). Upon determining which entry includes the matching transaction ID having the highest priority for that transaction, the lookup logic may cause data to be read from a corresponding entry in a data buffer (block 420). Additionally, the lookup logic may also cause the tracking buffer entry that was just read to be invalidated (e.g., by resetting its valid bit), and may also update priority information for any remaining valid entries that have the same transaction ID (block 425).

Figure 5:
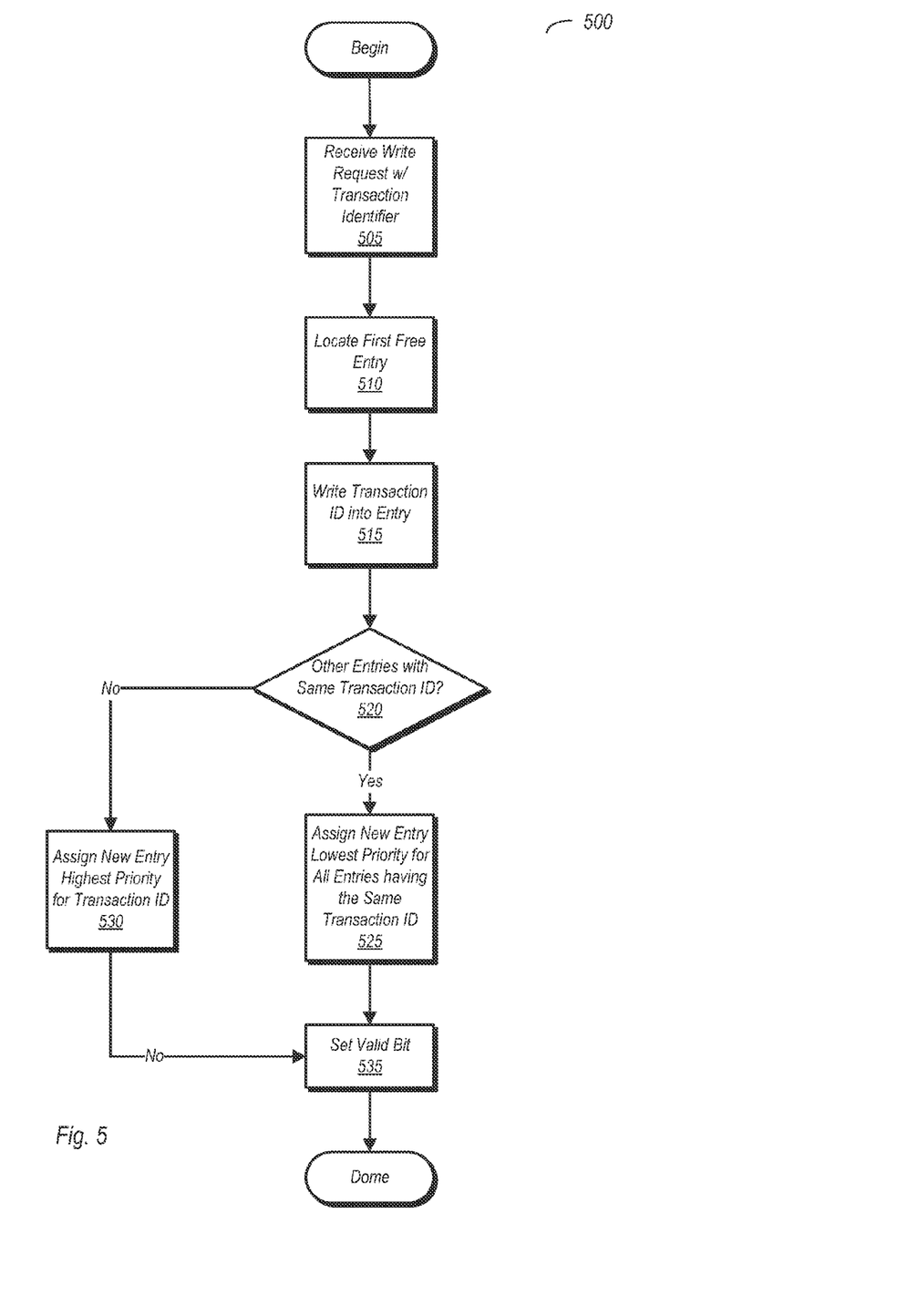
FIG. 5 is a flow diagram illustrating a write operation for one embodiment of a tracking buffer apparatus.

FIG. 5 is a flow diagram illustrating one embodiment of a method for writing tracking information into a tracking buffer. As with method 400 discussed above, method 500 may be performed by the various hardware embodiments discussed above, as well as by other embodiments not explicitly discussed herein.

Method 500 begins with the receipt of a write request that includes a transaction identifier (block 505). Upon receiving the read request, write logic may search the tracking buffer for a first free (i.e. available) entry (block 510). An entry may be indicated as free when its valid bit is in a reset state. After locating the free entry, the write logic may write a transaction ID into the entry (block 515). Concurrent with writing the transaction ID into the free entry, the write logic may also generate a write pointer to select a corresponding location in a data buffer to write the tracked data.

After writing the transaction ID into the first free entry, the write logic may determine if any other valid entry in the tracking buffer includes the same transaction ID (block 520). If one or more additional entries have the same transaction ID (block 520, yes), then the newly written entry may be assigned the lowest priority of all entries having that transaction ID (block 525). For example, if two additional valid entries have the same transaction ID, then the newly written entry will be third in priority for the corresponding transaction. If no other valid entries have the same transaction ID (block 520, no), then the newly written entry is assigned the highest priority for the corresponding transaction (block 530). Subsequent to or concurrent with the writing of a transaction ID and priority information, a valid bit is also set for the newly written entry (block 535) to indicate that it is now storing valid data.

Figure 6:
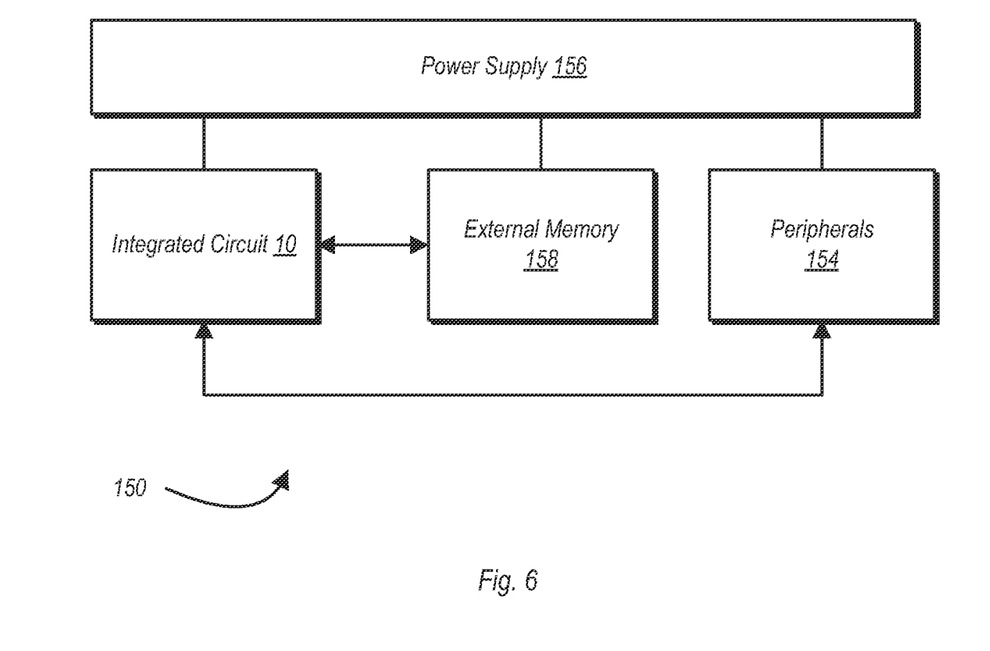
FIG. 6 is a block diagram of one embodiment of an exemplary system.

Turning next to FIG. 6, a block diagram of one embodiment of a system 150 is shown. In the illustrated embodiment, the system 150 includes at least one instance of an IC 10 (e.g., that implements SoC 10 of FIG. 1) coupled to one or more peripherals 154 and an external memory 158. A power supply 156 is also provided which supplies the supply voltages to the IC 10 as well as one or more supply voltages to the memory 158 and/or the peripherals 154. In some embodiments, more than one instance of the IC 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
a tracking buffer having N entries, wherein each entry includes a transaction identifier to identify a transaction, and an order identifier to identify a priority order within a particular transaction having a corresponding transaction identifier, wherein the tracking buffer is configured to store a same transaction identifier in multiple ones of the N entries; and
lookup logic configured to, responsive to receiving a request that excludes information other than the transaction identifier, locate in the tracking buffer an entry having a transaction identifier corresponding to the request and having a highest priority for a transaction associated with the transaction identifier, and further configured to cause a corresponding entry to be provided from a data buffer.

2. The apparatus as recited in claim 1, wherein the lookup logic is further configured to update priority information for any remaining entries associated with the transaction associated with the transaction identifier responsive to the corresponding entry being provided from the data buffer.

3. The apparatus as recited in claim 1, wherein the data buffer includes N entries, wherein each of the N entries of the data buffer corresponds to one of the N entries of the tracking buffer.

4. The apparatus as recited in claim 1, wherein the lookup logic is configured to access two or more entries in the tracking buffer having a same transaction identifier in a specified order, and wherein the lookup logic is further configured to access two or more entries having different transaction identifiers with respect to one another in an order in which corresponding requests are received irrespective of an order in which data corresponding to the different transaction identifiers was stored in the data buffer.

5. The apparatus as recited in claim 1, wherein the request includes the transaction identifier and excludes information appended to the transaction identifier.

6. A method comprising:
  storing, in a tracking buffer, a plurality of entries each having a transaction identifier, wherein storing comprises storing two or more of the plurality of entries having a same transaction identifier;
  locating an entry in the tracking buffer, the entry having a particular transaction identifier and further having an order identifier identifying the entry having a highest priority for a transaction associated with the particular transaction identifier, wherein said locating is performed responsive to receiving a request to access the transaction associated with the transaction identifier, the request excluding information other than the transaction identifier; and
  providing data from an entry in a data buffer, wherein the entry in the data buffer corresponds to the entry in the tracking buffer having the transaction identifier and the higher priority for the corresponding transaction.

7. The method as recited in claim 6, wherein the tracking buffer includes N entries each having a transaction identifier to identify a transaction and an order identifier to identify a priority within the transaction, and wherein the data buffer includes N entries each of which corresponds to a unique one of the N entries of the tracking buffer.

8. The method as recited in claim 6, further comprising:
  accessing data stored in two or more entries of the data buffer corresponding to a single transaction in an order in which the two or more entries corresponding to the single transaction were written into the data buffer; and
  accessing data stored in two or more entries of the data buffer corresponding to different transactions in an order in which corresponding requests are received and irrespective of an order in which the two or more entries corresponding to different transactions were stored in the data buffer.

9. The method as recited in claim 6, further comprising updating priority information for one or more remaining valid entries in the tracking buffer associated with the transaction responsive to providing data from the data buffer corresponding to the entry in the tracking buffer having the transaction identifier and the higher priority for the corresponding transaction.

10. The method as recited in claim 6, further comprising resetting a valid bit for the entry in the tracking buffer having the highest priority for the transaction associated with the transaction identifier responsive to providing data from the corresponding entry in the data buffer.

11. An integrated circuit comprising:
  a data buffer having N entries;
  a tracking buffer having N entries, wherein each of the N entries of the tracking buffer corresponds to a unique one of the N entries of the data buffer, and wherein each of the N entries of the tracking buffer includes a transaction identifier indicative of a transaction associated with that entry and an order identifier indicative of a priority of that entry relative to all entries associated with that transaction identifier, wherein the tracking buffer is configured to store multiple entries having a common transaction identifier; and
  access logic configured to, responsive to a request for data associated with a first transaction, locate a first entry in the tracking buffer, the first entry having a transaction identifier indicative of the first transaction and an order identifier indicating a highest priority for the first transaction, the request excluding information other than the transaction identifier, wherein the access logic is further configured to cause the data buffer to provide data from one of its N entries that corresponds to the first entry in the tracking buffer.

12. The integrated circuit as recited in claim 11, further comprising write logic configured to:
  locate a second entry in the tracking buffer having a valid bit in a reset state responsive to receiving a request to store data corresponding to a second transaction;
  write a transaction identifier corresponding to the second transaction in the second entry;
  write an order identifier indicating a priority of the second entry relative to other entries in the tracking buffer having the same transaction identifier; and
  set a valid bit in the second entry.

13. The integrated circuit as recited in claim 12, wherein the write logic is further configured to, responsive to receiving the request to store data corresponding to the second transaction:
  determine if the tracking buffer includes one or more valid entries storing the transaction identifier corresponding to the second transaction; and
  assign a priority to the second entry that is lower than that of any other valid entry in the tracking buffer corresponding to the second transaction.

14. The integrated circuit as recited in claim 11, wherein the access logic is coupled to receive requests for data, wherein the requests for data include a transaction identifier and exclude information appended to the transaction identifier.

15. The integrated circuit as recited in claim 11, wherein the access logic is configured to:
  for a first plurality of tracking buffer entries each associated with a common transaction, cause corresponding entries in the data buffer to be read in an order in which they were written into the data buffer; and
  for a second plurality of tracking buffer entries each associated with a different transaction than other ones of the second plurality, cause corresponding entries in the data buffer to be read in an order in which corresponding read requests were received irrespective of an order in which data entries corresponding to the second plurality were written to the data buffer.

16. A method comprising:
  receiving a request having a first transaction identifier corresponding to data to be written into a data buffer, the request excluding information other than the first transaction identifier;
  locating a first entry in a tracking buffer having a valid bit in a reset state, wherein the tracking buffer includes N entries, wherein each of the N entries of the tracking buffer corresponds to a unique one of N entries of the data buffer, and wherein the tracking buffer is configured to store multiple entries having a common transaction identifier;
  writing the first transaction identifier into the first entry;
  writing an order identifier into the first entry based on determining which, if any, additional entries of the tracking buffer are valid and include the first transaction identifiers; and
  setting a valid bit for the first entry.

17. The method as recited in claim 16, further comprising writing data corresponding to the first entry of the tracking buffer into a corresponding one of the N entries of the data buffer.

18. The method as recited in claim 16, further comprising:
  receiving a read request including the first transaction identifier;

determining which of a plurality of valid entries in the tracking buffer including the first transaction identifier has a highest priority over other ones of the entries including the same transaction identifier;

reading data from the data buffer from a data buffer entry corresponding to the one of the plurality of valid entries in the tracking buffer having the highest priority;

resetting a valid bit in the one of the plurality of valid entries in the tracking buffer having the highest priority responsive to said reading; and updating corresponding order identifiers in each of the remaining ones of the plurality of entries in the tracking buffer that are still valid and include the first transaction identifier.

19. The method as recited in claim 16, further comprising:

accessing entries in the tracking buffer having a common transaction identifier in an order in which they were written into the tracking buffer;

accessing entries in the tracking buffer associated with different transactions identifiers in an order in which corresponding requests are received and irrespective of an order in which the requests associated with different transaction identifiers were written to the tracking buffer.

20. The method as recited in claim 16 further comprising accessing a valid entry from the tracking buffer responsive to receiving a request that includes a transaction identifier and excludes information appended to the transaction identifier.

21. A system comprising:

a data buffer having N entries;

a tracking buffer having N entries, wherein each of the N entries of the tracking buffer corresponds to a unique one of the N entries of the data buffer, and wherein the tracking buffer is configured to store multiple ones of the N entries having a common transaction identifier;

read logic configured to, responsive to receiving a read request including a first transaction identifier and excluding information other than the first transaction identifier, read one of the N entries of the tracking buffer having the first transaction identifier and having a higher priority than other ones of the N entries that also include the first transaction identifier and further configured to cause a corresponding entry of the data buffer to be read; and write logic configured to, responsive to receiving a write request having a second transaction identifier, write, to a free one of the N entries of the tracking buffer, the transaction identifier and priority information for the free one of the N entries indicating a priority relative to other entries having the second transaction identifier, and further configured to cause data to be written to a corresponding entry of the data buffer.

22. The system as recited in claim 21, further comprising demultiplexer coupled to the write logic, the demultiplexer having one input and N outputs, wherein each of the N outputs is coupled to one of the N entries of the data buffer, the write logic is configured to select one of the N entries of the data buffer in which data is to be written based on a corresponding one of the N entries to which a transaction identifier and priority information is written.

23. The system as recited in claim 22, wherein the write logic is further coupled to the tracking buffer, wherein the write logic is configured to, responsive to a write request, locate a first entry having a valid bit in a reset state, and wherein the write logic is further configured to place the valid bit of the first entry into a set state responsive to writing a transaction identifier and priority information into the first entry.

24. The system as recited in claim 23, wherein the read logic is further configured to reset a valid bit of a given entry of the tracking buffer responsive to accessing the given entry and causing corresponding data to be provided from the data buffer.

25. The system as recited in claim 21, further comprising a multiplexer having N inputs each coupled to a corresponding one of the N entries of the data buffer, wherein the read logic is configured to select one of the N entries of the data buffer responsive to receiving a read request.

* * * * *